United States Patent
Yokoyama et al.

(10) Patent No.: US 9,777,578 B2
(45) Date of Patent: Oct. 3, 2017

(54) RADIAL TURBINE BLADE

(71) Applicant: MITSUBISHI HEAVY INDUSTRIES, LTD., Tokyo (JP)

(72) Inventors: Takao Yokoyama, Tokyo (JP); Masaki Tojo, Tokyo (JP); Satomi Nagae, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 302 days.

(21) Appl. No.: 14/655,296

(22) PCT Filed: Dec. 27, 2012

(86) PCT No.: PCT/JP2012/083946
§ 371 (c)(1),
(2) Date: Jun. 24, 2015

(87) PCT Pub. No.: WO2014/102981
PCT Pub. Date: Jul. 3, 2014

(65) Prior Publication Data
US 2015/0330226 A1 Nov. 19, 2015

(51) Int. Cl.
*F01D 5/14* (2006.01)
*F01D 25/24* (2006.01)
(Continued)

(52) U.S. Cl.
CPC ............ *F01D 5/14* (2013.01); *F01D 1/22* (2013.01); *F01D 5/04* (2013.01); *F01D 5/141* (2013.01);
(Continued)

(58) Field of Classification Search
None
See application file for complete search history.

(56) References Cited

U.S. PATENT DOCUMENTS

| 2004/0223840 A1 | 11/2004 | Vogiatzis et al. |
| 2009/0047134 A1 | 2/2009 | Chen et al. |

FOREIGN PATENT DOCUMENTS

| CN | 1902379 A | 1/2007 |
| EP | 2 351 920 A1 | 8/2011 |

(Continued)

OTHER PUBLICATIONS

Extended European Search Report, dated Feb. 5, 2016, for corresponding European Application No. 12890828.2.
(Continued)

*Primary Examiner* — Dwayne J White
*Assistant Examiner* — Theodore Ribadeneyra
(74) *Attorney, Agent, or Firm* — Birch, Stewart, Kolasch & Birch, LLP (57) ABSTRACT

An object is to provide a radial turbine blade that can reduce an impact loss of inflowing gas at a leading edge of the turbine blade and achieve a higher turbine efficiency, even in a case of a flow field corresponding to a low turbine operational velocity ratio U/C0 due to a throttling operation on a variable nozzle mechanism of a variable geometry turbocharger.

In a radial turbine blade, a hub-side end portion Pa at a leading edge 51 of a turbine blade 50 is formed to be positioned more on a rear side in a rotation direction R of the turbine blade 50 than a shroud-side end portion Sc at the leading edge 51, and a straight line connecting between the shroud-side end portion Sc and the hub-side end portion Pa is inclined with respect to a straight line extending in a rotation axis direction from the shroud-side end portion Sc at the leading edge 51 onto a hub 17 surface by an angle in a range from 30° to 70° as viewed in the radial direction of the turbine blade 50.

7 Claims, 8 Drawing Sheets

(51) Int. Cl.
*F01D 5/04* (2006.01)
*F01D 1/22* (2006.01)
*F02C 6/12* (2006.01)
*F02B 37/24* (2006.01)

(52) U.S. Cl.
CPC ............... *F01D 25/24* (2013.01); *F02C 6/12* (2013.01); *F02B 37/24* (2013.01); *F05D 2220/30* (2013.01); *F05D 2240/301* (2013.01)

(56) References Cited

FOREIGN PATENT DOCUMENTS

| EP | 2 447 473 A1 | 5/2012 |
|---|---|---|
| JP | 2-130223 A | 5/1990 |
| JP | 6-185371 A | 7/1994 |
| JP | 10-131704 A | 5/1998 |
| JP | 2008-133766 A | 6/2008 |
| JP | 2011-7141 A | 1/2011 |
| JP | 2011-132810 A | 7/2011 |
| JP | 2012-52520 A | 3/2012 |
| JP | 2012-520412 A | 9/2012 |
| JP | 2012-241564 A | 12/2012 |
| WO | WO 2005/052322 A1 | 6/2005 |
| WO | WO 2010/052911 A1 | 5/2010 |

OTHER PUBLICATIONS

Office Action effective Jul. 6, 2016 issued to the corresponding Japanese Application No. 2014-553975 with an English Translation.
Office Action effective Oct. 28, 2016 issued in the corresponding Chinese Application No. 201280077659.6 with an English translation.
International Preliminary Report on Patentability and Written Opinion of the International Searching Authority, along with an English translation (forms PCT/IB/373, PCT/ISA/237, PCT/IB/326 and PCT/IB/338), issued Jul. 9, 2015 for International Application No. PCT/JP2012/083946.
International Search Report and Written Opinion of the International Searching Authority (forms PCT/ISA/210, PCT/ISA/237 and PCT/ISA/220), issued Apr. 2, 2013, for International Application No. PCT/JP2012/083946,.

FIG.1

ROTATION DIRECTION R

FIG.2

ROTATION DIRECTION R

FIG.3

ROTATION DIRECTION R

FIG.4A

LEADING EDGE WITH LINEAR SHAPE

LEADING EDGE WITH PROTRUDING SHAPE

LEADING EDGE WITH S SHAPE

(PEAK EFFICIENCY STATE U/C0)

FIG.9

(LOW U/C0)

RADIAL TURBINE BLADE

TECHNICAL FIELD

The present invention relates to a radial turbine blade that is used in an exhaust turbocharger, a small gas turbine, an expansion turbine, and the like of an internal combustion engine, and configured to drivingly rotate a turbine rotor with working gas flowing in a radial direction from a spiral scroll to a turbine blade to act on the turbine blade and then flowing out in an axial direction.

BACKGROUND

Tightened emission control has brought about a strong demand for higher response to engine low velocity, and thus higher response of a turbocharger has been called for.

When the engine is accelerated, exhaust-gas pressure increases to provide energy to a turbine, and then the number of revolutions of the turbine increases. Thus, there is a problem that the number of revolutions of the turbine cannot be increased quickly due to a low turbine efficiency attributable to a turbine operational velocity ratio (U/C0) being much lower than a design point because of the early rise in the ratio of the pressure at the inlet of the turbine blade to the pressure at the outlet thereof.

Downsizing of the turbine and flow inclination to achieve lower inertia moment, which are currently conducted attempts to quickly increase the number of revolutions, ironically lead to further degradation of the turbine operational velocity ratio (U/C0) and performance degradation, and thus fail provide a sufficient response improvement effect.

Figure 10A:
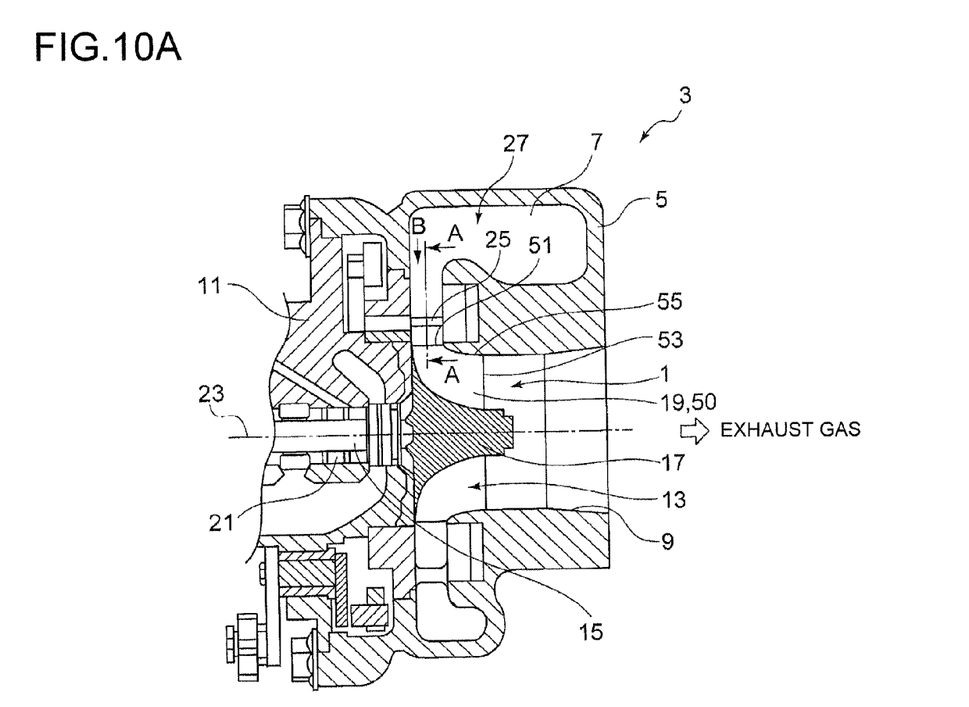
FIG. 10A is a cross-sectional view partially showing a configuration of a variable geometry turbocharger using a radial turbine.

FIG. 10A shows an example of a variable geometry turbocharger 3 using a radial turbine 1. In the figure, a spiral scroll 7 is formed in a turbine casing 5, and a gas outlet path 9 is formed on an inner circumference side. Furthermore, a compressor casing accommodating an unillustrated compressor, the turbine casing 5, and a bearing housing 11 are formed.

A turbine rotor 13 includes: a hub 17 fixed to an end portion of a rotor shaft 15; and a plurality of turbine blades 19 that fixedly adhere to an outer circumference of the hub 17 at an equal interval in a circumferential direction. The unillustrated compressor is coupled to a side of the rotor shaft 15 opposite to the turbine rotor 13.

A bearing 21 that supports the rotor shaft 15 is disposed in the bearing housing 11. The rotor shaft 15 and the hub 17 rotate about a center line of rotation 23.

A plurality of nozzle vanes 25 are disposed on an inner circumference side of the scroll 7 at an equal interval along the circumferential direction of the turbine rotor 13. The vane angle of the nozzle vane 25 can be changed by a variable nozzle mechanism 27.

While a variable geometry turbocharger 3 with the variable nozzle mechanism including the radial turbine 1 is under operation, exhaust gas from an internal combustion engine (not shown) enters the scroll 7 and flows into a space between the nozzle vanes 25 while swirling along the spiral in the scroll 7.

Thus, the exhaust gas flows through the space between the blades of the nozzle vanes 25, to flow from an inlet end surface on an outer circumference side of a plurality of turbine blades 19 into a space between the turbine blades 19. Then, the exhaust gas flows in the radial direction toward the center of the turbine rotor 13, to provide an expansion effect for the turbine rotor 13. Thereafter, the exhaust gas flows out in an axial direction to be emitted outside from the device through the gas outlet path 9.

In the variable geometry turbocharger 3, when the engine is accelerated, the nozzle vanes 25 are throttled, whereby a flowrate is reduced and a flow velocity is increased.

Figure 7:
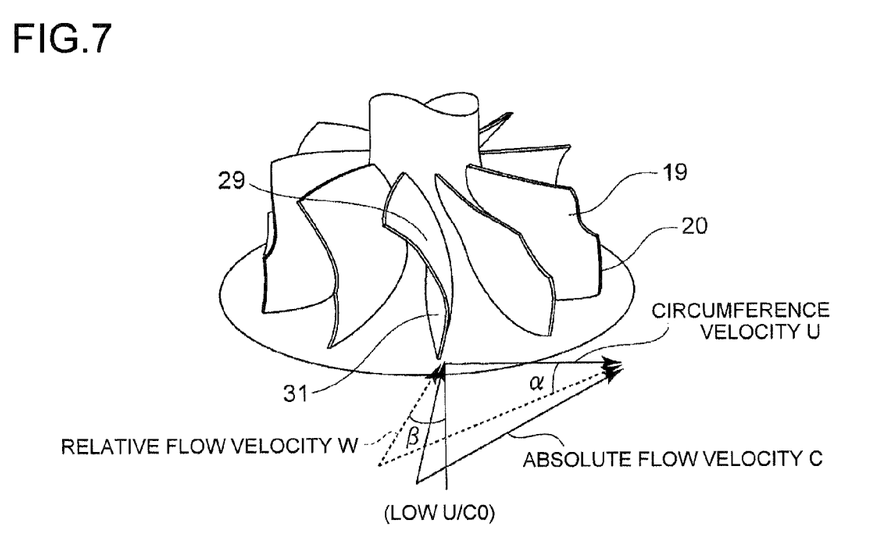
FIG. 7 is a diagram showing a velocity triangle indicating a state of working gas flowing into a general turbine blade under a condition of low U/C0.
Figure 8:
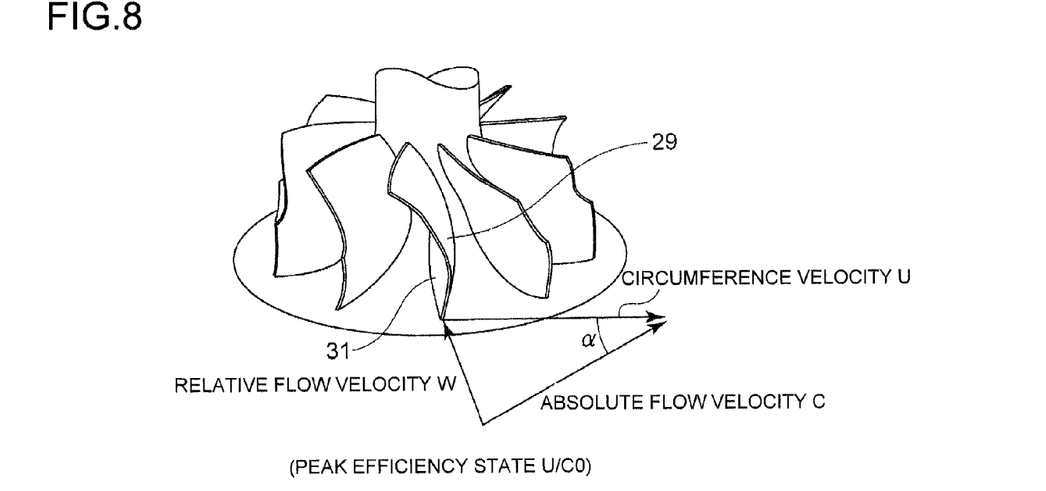
FIG. 8 is a diagram showing a velocity triangle indicating a state of working gas flowing into the general turbine blade under a condition of peak efficiency U/C0.

FIG. 7 and FIG. 8 show a velocity triangle formed by a circumferential direction velocity U at the leading edge 20 of the turbine blade 19, an absolute flowing-in velocity C, and a relative flowing-in velocity W. FIG. 7 shows a state of low U/C0, and FIG. shows a state of peak efficiency U/C0. As illustrated in FIG. 8 as an ideal case, the exhaust gas flows in from a slightly back side (negative pressure surface side 29) of the turbine blade 19.

However, when the nozzle vanes 25 are strongly throttled, the low U/C0 state shown in FIG. 7 is achieved where the absolute flow velocity is excessively inclined (dotted line in FIG. 6). Thus, the exhaust gas flows in from the front side (pressure surface side) 31 of the turbine blade.

Figure 9:
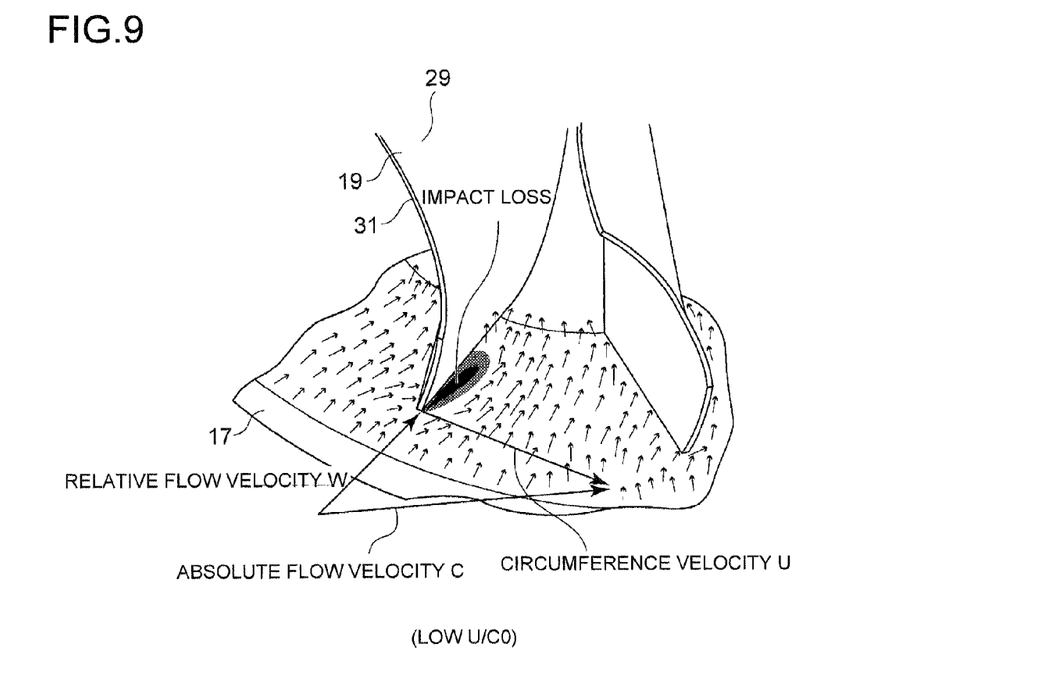
FIG. 9 is a diagram for describing an impact loss at the general turbine blade.

As described above, a reduction of the turbine operational velocity ratio U/C0 leads to a large reduction of a flow angle α at the leading edge. Thus, the flowing exhaust gas collides with the pressure surface side 31 due to a large shift between a leading edge angle (metal angle) β of the turbine blade 19 and an angle of the flow. Thus, a leakage flow of the exhaust gas flowing around to reach the negative pressure surface side 29 from the pressure surface side 31, and an excessively large separated flow toward the negative pressure surface side are produced to cause an impact loss and efficiency degradation. FIG. 9 shows a state of an impact loss produced on the negative pressure surface side 29 in the state of low U/C0.

Figure 11A:
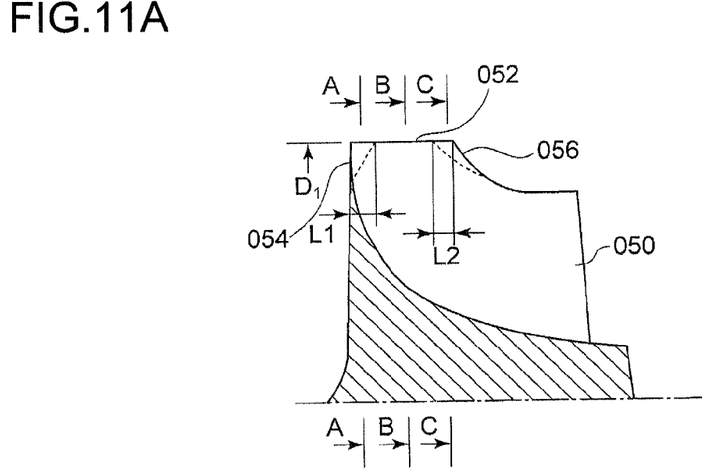
FIG. 11A is a diagram for describing a conventional technique and shows a meridional shape of a turbine blade.
Figure 11B:
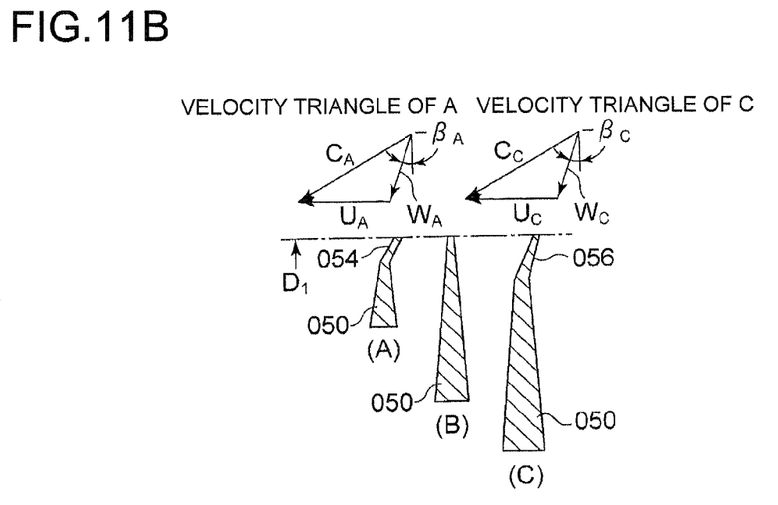
FIG. 11B is diagram showing cross-sectional shapes in FIG. 11A showing the conventional technique.

Patent Document 1 (Japanese Patent Application Laid-open No. 2011-132810) discloses an example of making a leading edge angle of the radial turbine blade match a direction of a flow of inflowing gas. More specifically, Patent Document 1 discloses a configuration in which a blade distal end shape adjacent to both walls on a shroud side 056 and a hub side 054 defining a height direction of an inlet 052 of a turbine blade 050 into which working gas flows has a direction changed to match a flowing-in direction of a gas relative flowing-in velocity component as shown in FIG. 11A and FIG. 11B.

CITATION LIST

Patent Literature

Patent Document 1: Japanese Patent Application Laid-open No. 2011-132810

SUMMARY

Technical Problem

In Patent Document 1, the blade distal end shape adjacent to both walls on the shroud side 056 and the hub side 054 defining the height direction of the inlet 052 of the turbine blade 050 into which the working gas flows has a direction changed to match the flowing-in direction of the gas relative flowing-in velocity component. Here, the direction of the distal end portion of the vertically standing blade distal end shape is changed (refer to FIG. 11B). Thus, bending stress and centrifugal stress are likely to be produced at a portion where the shape is changed.

As described above with reference to FIG. 7, a reduction of the turbine operational velocity ratio U/C0 leads to a large reduction of a flow angle α at the leading edge. Thus, the flowing exhaust gas collides with the pressure surface side 31 due to a large shift between a leading edge angle (metal angle) β of the turbine blade 19 and an angle of the flow. Thus, the leakage flow of the exhaust gas flowing around to reach the negative pressure surface side 29 from the pressure surface side 31, and an excessively large separated flow toward the negative pressure surface side 29 are produced to cause an impact loss resulting in turbine efficiency degradation.

Here, C0 in the turbine operational velocity ratio U/C0 represents a theoretical gas rate which is represented by a function between a gas temperature T and a turbine pressure ratio Π(C0=f(T, Π)), and is a theoretical gas rate obtained when gas with a certain pressure and temperature is expanded to have certain different pressure and temperature. Furthermore, U represents a circumference velocity of the turbine blade which is represented by a function between the number of revolutions and a diameter D of the turbine blade (U=f (N, D)).

Thus, downsizing of the turbine blade diameter and rise in the exhaust gas temperature are likely to reduce U and increase C0, respectively, and thus are likely to reduce the turbine operational velocity ratio U/C0. The increase in the theoretical gas rate, caused by an operation of throttling the variable nozzles, is likely to reduce the turbine operational velocity ratio U/C0 as the parameter.

Thus, in view of the problems described above, an object of the present invention is to provide a radial turbine blade that can reduce an impact loss of inflowing gas at a leading edge of the turbine blade and achieve a higher turbine efficiency, even in a case of a flow field corresponding to a low turbine operational velocity ratio U/C0 due to an operation of throttling a variable nozzle mechanism of a variable geometry turbocharger.

Solution to Problem

To achieve the object, the present invention provides a radial turbine blade configured to drivingly rotate a turbine rotor with working gas flowing in a radial direction from a spiral scroll formed in a turbine casing to a turbine blade of the turbine rotor positioned on an inner side of the scroll to act on the turbine blade and then flowing out in a rear shaft direction, in which a hub-side end portion at a leading edge of the turbine blade is formed to be positioned more on a rear side in a rotation direction of the turbine blade than a shroud-side end portion at the leading edge, and a straight line connecting between the shroud-side end portion and the hub-side end portion is inclined with respect to a straight line extending in a rotation axis direction from the shroud-side end portion at the leading edge onto the hub surface by an angle in a range from 30° to 70° as viewed in the radial direction of the turbine blade.

According to the present invention, the hub-side end portion of the leading edge is positioned more on the rear side in the rotation direction of the turbine blade than the shroud-side end portion thereof. Thus, the leading edge has an inclined shape inclined toward the hub surface. In a case of a flow field corresponding to a low velocity ratio U/C0, the working gas that has been collided with the pressure surface side can be guided to flow in the axial direction of the turbine blade due to the inclined shape, and thus the working gas can easily flow in a direction toward the outlet to be discharged. Thus, the configuration can reduce the impact which has been large in a conventional case where the leading edge has a substantially vertically standing shape, and the working gas directly collides with the pressure surface side to produce a leakage flow of the exhaust gas flowing around to reach a negative pressure surface side from a pressure surface side and an excessively large separated flow toward the negative pressure surface side.

As a result, the impact loss of the inflowing gas can be reduced, and the turbine efficiency can be improved.

According to the present invention, the inclination angle is in a range from 30° to 70°. The effect of guiding the working gas in the axial direction of the turbine blade is obtained by thus making the straight line connecting between the shroud-side end portion and the hub-side end portion of the leading edge inclined with respect to the straight line extending in the rotation axis direction onto a hub surface.

When the inclination angle is smaller than 30°, the exhaust gas collides with the pressure surface side substantially directly as in the conventional case. Thus, the effect of achieving a low pressure loss is difficult to obtain. When the inclination angle is larger than 70°, turbine blades blocks the space between the blades and thus, it is difficult to secure a flow path cross section and to secure a flow rate for large flow rate side control.

The angle is therefore preferably in a range from 30° to 70°, and more preferably in a range from 40° to 60°.

In the present invention, preferably, a line segment, connecting between a leading edge hub position on a leading edge hub circle formed by connecting leading edges on a plurality of the turbine blades on a hub upper surface of and a center line of rotation of the turbine blades, is positioned more on a rear side in a rotation direction of the turbine blades about a rotation center line of the turbine blades than a line segment, connecting between a trailing edge hub position on a trailing edge hub circle formed by connecting trailing edges of the plurality of turbine blades on a hub and the center line of rotation of the turbine blades.

Figure 2:
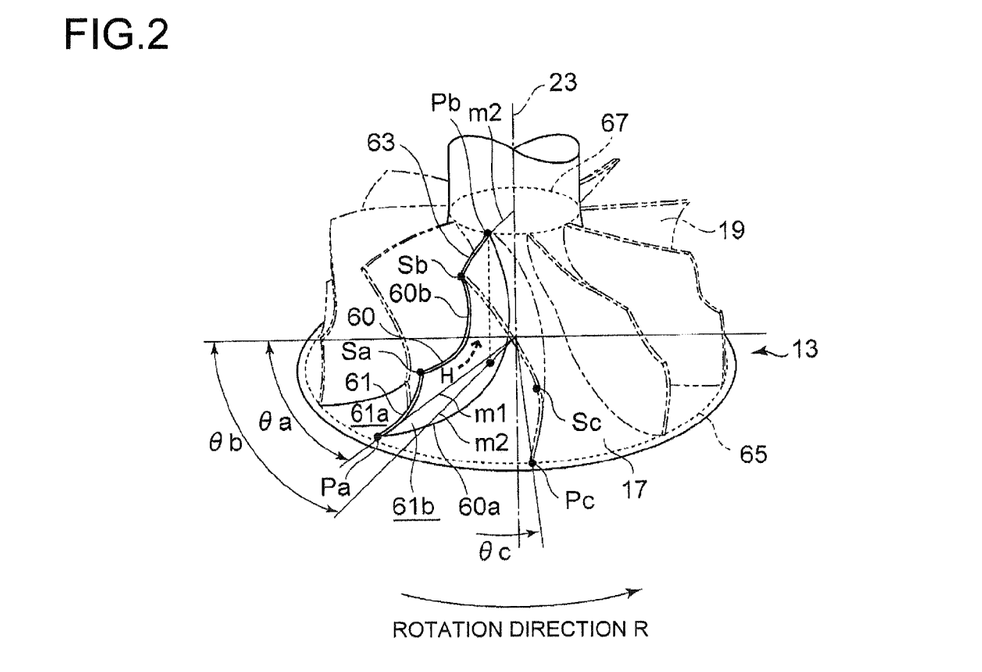
FIG. 2 is a perspective view showing a shape of a turbine blade according to a second embodiment.

More specifically, as illustrated in FIG. 2, a leading edge hub coordinate θa indicating the leading edge hub position Pa is disposed more on the rear side in the rotation direction of the turbine blade than a trailing edge hub coordinate θb indicating the trailing edge hub position Pb (θa<θb).

In a comparative example, a leading edge hub position Pc on the hub surface in FIG. 2 is at a leading edge hub coordinate θc, and thus a relationship opposite to that in the present invention is established (θb<θc). With the relationship in the present invention, a large and thus appropriate inclination angle of the leading edge can be set.

Furthermore, a turning angle of the turbine blade can be set to a sufficiently small value. More specifically, the turning angle, which is an angle for turning the flow of the working gas so that the working gas flows in the direction to the center line of rotation of the turbine blade and to the trailing edge along the pressure surface of the turbine blade as indicated by an arrow H in FIG. 2, can be set to a sufficiently small value. The effect of guiding the working gas to the trailing edge of the turbine blade is difficult to obtain when the turning angle is too large or too small.

With the turning angle set to a sufficiently small value, guiding of the flow of the exhaust gas that has collided with the pressure surface to the center line of rotation and the trailing edge can be facilitated so that the exhaust gas is prevented from flowing from the pressure surface side to the negative pressure surface side through a clearance on an outer circumference edge.

Further in the present invention, preferably, a line segment connecting between a leading edge shroud position on a leading edge shroud circle formed by connecting leading edges of the plurality of turbine blades on a shroud side and the center line of rotation of the turbine blades is positioned more on the rear side in the rotation direction of the turbine blade than a line segment connecting between a trailing edge shroud position on a trailing edge shroud circle formed by connecting trailing edges of the plurality of turbine blades on the shroud side.

Figure 3:
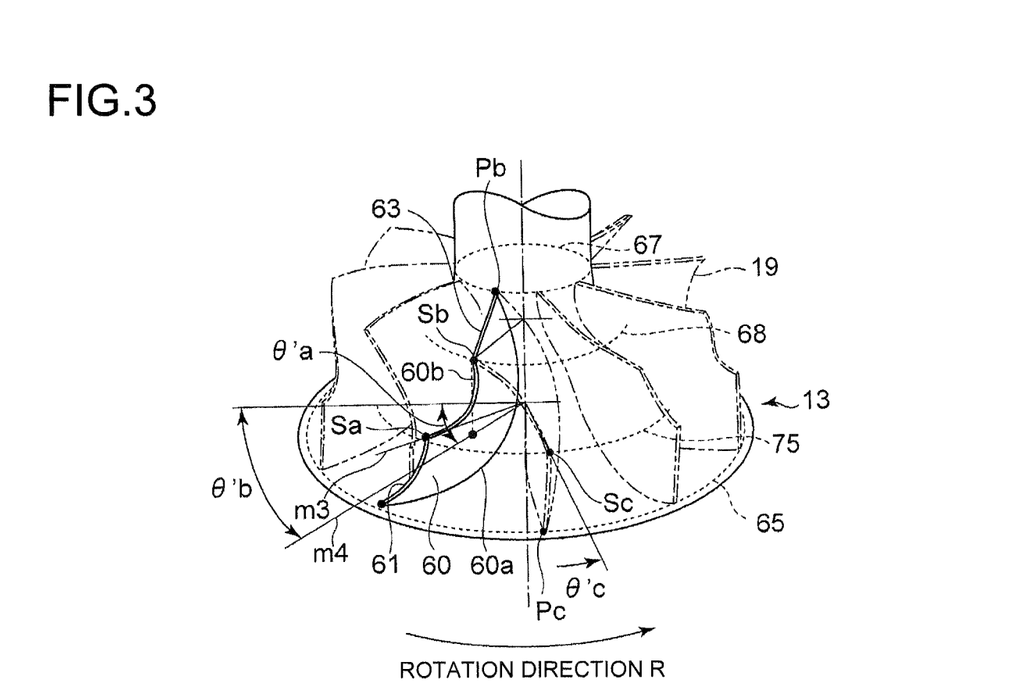
FIG. 3 is a perspective view showing a modification of the second embodiment.

Preferably, a positional relationship that is the same as that on the hub side, that is, the shroud coordinate relationship θ'a<θ'b as shown in FIG. 3, is established between a leading edge shroud position Sa and a trailing edge shroud position Sb on the shroud side. By thus establishing the same positional relationship on the hub side and on the shroud side, the working gas that has collided on the pressure surface of the turbine blade can have the direction of flow more efficiently changed to a direction toward the center line of rotation of the turbine blade along the pressure surface.

In a comparative example, the leading edge shroud position Sc is at a leading edge shroud coordinate θ'c in FIG. 3, and thus a relationship opposite to that in the present invention is established (θ'b<θ'c). With the relationship in the present invention, a leading edge shroud position can be set to a position with which a large and thus appropriate inclination angle of the leading edge can be set.

In the present invention, preferably, the leading edge of the turbine blade connecting between the shroud-side end portion and the hub-side end portion is formed to have a substantially linear shape.

With such a linear shape, a uniform load in the blade height direction can be achieved, whereby an unwanted secondary flow can be prevented from being produced.

In the present invention, preferably, the leading edge of the turbine blade connecting between the shroud-side end portion and the hub-side end portion is formed to have a curved shape protruding in the rotation direction of the turbine blade.

Since the leading edge of the turbine blade has a curved shape protruding in the rotation direction of the turbine blade as described above, an amount of working gas in the center portion is large considering the flow rate balance. Thus, by discharging the working gas in the center portion of the leading edge toward the rear along the center line of rotation of the turbine blade, the working gas can be efficiently discharged in the direction toward the outlet. Thus, the leakage flow toward the negative pressure surface side can be effectively prevented from being produced.

The curved shape may have a hub side inclined by a large angle and extending along the hub surface and a shroud side inclined by a smaller angle.

With a relationship in which the leading edge hub side is inclined by a large angle and the shroud side is inclined by a smaller angle, a loss on the hub side involving a large collision angle can be effectively reduced.

The leading edge hub side has a large inclination angle, because on the hub side, the working gas is difficult to turn to the direction toward the outlet and the radial direction flow velocity of the main flow (absolute flow velocity C (refer to FIG. 7 to FIG. 9)) is high and thus the collision angle is large.

In the present invention, preferably, the leading edge of the turbine blade connecting between the shroud-side end portion and the hub-side end portion has a hub side protruding in the rotation direction of the turbine blade and has a shroud side protruding in direction opposite to the rotation direction, so that the leading edge as a whole is formed to have a substantially S shape.

As described above, with the substantially S shape, on the side closer to the hub involving a large collision angle as described above, the leading edge continues to the hub surface with a large inclination angle. Thus, a lower impact loss can be achieved. On the shroud side, the leading edge protrudes in the direction opposite to the rotation direction. Thus, the exhaust gas can be prevented from flowing through the clearance formed on the outer circumference edge on the shroud side and thus can be prevented from flowing toward the negative pressure surface side.

In the present invention, preferably, the radial turbine blade is used in a variable geometry turbocharger with a variable nozzle mechanism in which a plurality of nozzle vanes are disposed at an equal interval along a circumferential direction of a turbine on an inner circumference side of the scroll, and a vane angle of the nozzle vanes is changed.

All things considered, this technique, applied to a variable geometry turbocharger, can reduce an impact loss of inflowing gas at a leading edge of a turbine blade to achieve a higher turbine efficiency, even in a case of a flow field corresponding to low U/C0 as a result of an operation of throttling variable nozzle vanes to the maximum level.

Advantageous Effects

In the present invention, an impact loss of inflowing gas at a leading edge of the turbine blade can be reduced and a higher turbine efficiency can be achieved, even in a case of a flow field corresponding to a low velocity ratio U/C0 due to a throttling operation on a variable nozzle mechanism of a variable geometry turbocharger.

DETAILED DESCRIPTION

Preferred embodiments of the present invention shown in the accompanying drawings will now be described in detail. It is intended, however, that dimensions, materials, shapes, relative positions, and the like of components described in the embodiments shall be interpreted as illustrative only and not limitative of the scope of the present invention unless otherwise specified.

First Embodiment

Figure 1:
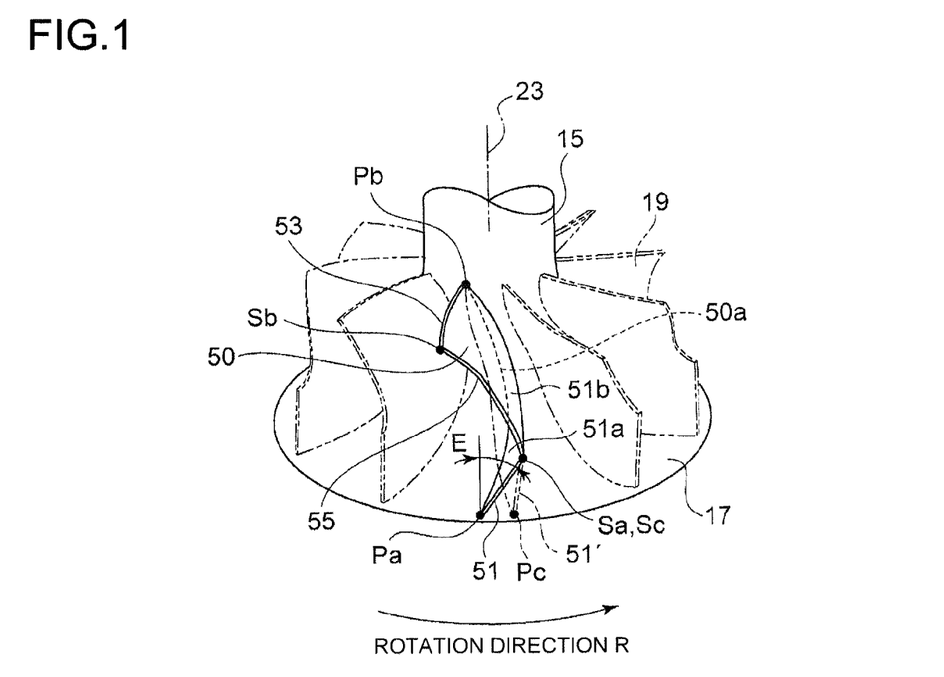
FIG. 1 is a perspective view showing a shape of a main part of a turbine blade according to a first embodiment of the present invention.

With reference to FIG. 1, a first embodiment of the present invention will be described.

Figure 10B:
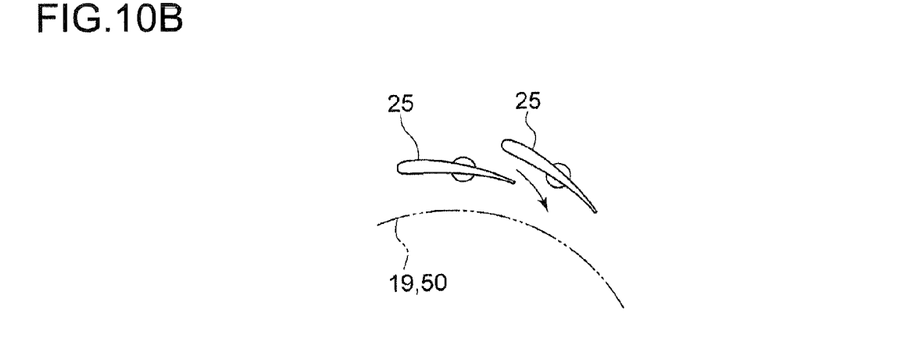
FIG. 10B is a cross-sectional view taken along line A-A in FIG. 10A.

First, with reference to FIG. 10A and FIG. 10B, a variable geometry turbocharger 3 using a radial turbine 1 will be described. In the figure, a spiral scroll 7 is formed in a turbine casing 5, and a gas outlet path 9 is formed on an inner circumference side. Furthermore, a compressor casing accommodating an unillustrated compressor, the turbine casing 5, and a bearing housing 11 are formed.

A turbine rotor 13 includes a hub 17 fixed to an end portion of a rotor shaft 15 and a plurality of turbine blades 50 fixedly adhering to an outer circumference of the hub 17 at an equal interval in a circumferential direction. The unillustrated compressor is coupled to a side of the rotor shaft 15 opposite to the turbine rotor 13.

The unillustrated compressor is coupled to the opposite side of the rotor shaft 15. A bearing 21 that supports the rotor shaft 15 is disposed in the bearing housing 11. The rotor shaft 15 and the hub 17 rotate about a center line of rotation 23.

A plurality of nozzle vanes 25 are disposed on an inner circumference side of the scroll 7 at an equal interval in the circumferential direction of the turbine rotor 13. The vane angle of the nozzle vanes 25 can be changed by a variable nozzle mechanism 27.

While the variable geometry turbocharger 3 with the variable nozzle mechanism including the radial turbine 1 is under operation, exhaust gas from an internal combustion engine (not shown) enters the scroll 7 and flows into a space between the nozzle vanes 25 while swirling along the spiral in the scroll 7.

Thus, the exhaust gas flows through the space between the blades of the nozzle vanes 25, to flow from an inlet end surface on an outer circumference side of the plurality of turbine blades 50 into a space between the turbine blades 50. Then, the exhaust gas flows in the radial direction toward the center of the turbine rotor 13, to provide an expansion effect for the turbine rotor 13. Thereafter, the exhaust gas flows out in an axial direction to be emitted outside from the device through the gas outlet path 9.

In the variable geometry turbocharger 3, when the engine is accelerated, the nozzle vanes 25 are throttled, whereby a flowrate is reduced and a flow velocity is increased.

As illustrated in FIG. 1, in the first embodiment, the plurality of turbine blades 50 stand on a surface of the hub 17 at an equal interval in the circumferential direction. Each turbine blade 50 includes: a leading edge 51 on a side from which the exhaust gas as working gas flows in; a trailing edge 53 that guides the exhaust gas that has passed through the space between the turbine blades 50 to be discharged in a direction of the center line of rotation 23 of the rotor shaft 15 to reach the gas outlet path 9; and an outer circumference edge portion 55 which is adjacent to and rotates along an inner circumference of a shroud portion of the turbine casing 5.

In FIG. 1, the turbine blade 50 is joined to the surface of the hub 17 along a hub joining line 50a. In the present invention, a leading edge hub position Pa on a leading edge end portion side of the hub joining line 50a is positioned as follows.

The leading edge hub position Pa as a hub-side end portion of the leading edge 51 of the turbine blade 50 is positioned more on a rear side (upstream side) in a rotation direction of the turbine rotor 13 than a leading edge hub position Pc on the surface of the hub 17 of the turbine blade according to the comparative example. Thus, an inclination angle E of the leading edge 51 can be obtained that is inclined with respect to a substantially orthogonal direction (E≈0) in the comparative example.

In other words, a straight line, connecting between the leading edge shroud position Sc and the leading edge hub position Pa, is inclined with respect to a straight line, extending in the direction of the center line of rotation 23 onto the surface of the hub 17, by an inclination angle E within a predetermined range in a radial direction view of the turbine blade 50. The radial direction view of the turbine blade 50 is a view in a direction B in FIG. 10.

Unlike a turbine blade as a comparative example denoted by a numeral 51' in FIG. 1 that stands substantially vertically from the hub surface, the turbine blade 50 of the present invention has a shape inclined in the rotation direction of the turbine rotor 13. The inclination angle E is preferably in a predetermined range from 30° to 70°, and is more preferably in a range from 40° to 60°.

When the turbine blade 50 is inclined by an angle E in a range 30° to 70°, the working gas collides with the pressure surface side 51a of the inclined shape and flows in the direction of the center line of rotation 23 of the turbine blade 50, and thus the working gas can be easily discharged to the gas outlet path 9 from the trailing edge 53. On the other hand, when the shape of the leading edge portion standing substantially vertically in the comparative example is employed, the working gas directly collides with the pressure surface side. This causes a leakage flow of the exhaust gas flowing around to reach the negative pressure surface side 29 (refer to FIG. 7) from the pressure surface side 31, a stagnation pressure on the pressure surface side 31, and an excessively large separated flow toward the negative pressure surface side, which lead to a large impact loss. The present invention can reduce such an impact loss.

When the inclination angle is smaller than 30°, the exhaust gas collides with the pressure surface side substantially directly as in the comparative example. Thus, the effect of achieving a low pressure loss is difficult to obtain. When the inclination angle is larger than 70°, it is difficult to secure a flow path between adjacent turbine blades and to secure a flow rate for large flow rate side control. All things considered, the inclination angle is preferably in a range from 30° to 70°, and more preferably in a range from 40° to 60°.

As described above, with the shape of the turbine blade 50 in the first embodiment, due to the swirling flow of the exhaust gas formed in the spiral scroll 7 in the turbine casing 5, the exhaust gas flows through the space between the nozzle vanes 25 of the variable geometry turbocharger 3 and flows toward the inner side to collide with the leading edge 51 of the turbine blade 50 of the radial turbine 1.

When the nozzle vanes 25 are throttled, the exhaust gas flow rate is reduced and the flow velocity is increased. In this state, as illustrated in FIG. 7, the exhaust gas flows to the leading edge 51 of the turbine blade 50 from the pressure surface side 51a of the turbine blade 50 as in the case of the low U/C0. Here, the exhaust gas flowing in the radial direction toward the center of the turbine rotor 13 is guided by the inclined surface of the leading edge 51, having the inclined shape, to flow in the direction of the center line of rotation 23 (axial direction) of the turbine blade 50. Thus, the exhaust gas is discharged from the trailing edge 53 to the gas outlet path 9.

Thus, a low impact loss can be achieved by preventing the leakage flow of the exhaust gas flowing around to reach the negative pressure surface side 51b from the pressure surface side 51a and the excessively large separated flow toward the negative pressure surface side 51b from being produced. Furthermore, the stagnation pressure on the pressure surface side 51a can be reduced, whereby the impact loss can be further reduced. As a result, a higher turbine efficiency can be achieved with a lower impact loss of inflowing gas.

Second Embodiment

With reference to FIG. 2 and FIG. 3, a second embodiment will be described.

In the first embodiment, the leading edge 51 has the advantageous shape achieved by the inclination of the straight line connecting between the leading edge shroud position Sc and the leading edge hub position Pa. The second embodiment provides a further advantage achieved by a positional relationship between a leading edge side 61 and a trailing edge side 63 of a hub joining line 60a representing a connection position between the turbine blade 60 and the upper surface of the hub 17.

As illustrated in FIG. 2, a line segment m1, connecting between a leading edge hub position Pa on a leading edge hub circle 65 formed by connecting between leading edges 61 of a plurality of the turbine blades 60 on the upper surface of the hub 17 and the center line of rotation 23 of the turbine blade 60, is positioned more on the rear side in the rotation direction R of the turbine blade 60 about the center line of rotation 23 of the turbine blade 60 than a line segment m2, connecting between a trailing edge hub position Pb on a trailing edge hub circle 67 formed by connecting between trailing edges 63 of the plurality of turbine blades 63 on the upper surface of the hub 17 and the center line of rotation 23 of the turbine blade 60.

In other words, as illustrated in FIG. 2, a leading edge hub coordinate θa indicating the leading edge hub position Pa is disposed more on the rear side in the rotation direction R of the turbine blade 60 than a trailing edge hub coordinate θb indicating the trailing edge hub position Pb (θa<θb).

As a comparative example illustrated in FIG. 2, a leading edge hub coordinate θc indicating a leading edge hub position Pc is disposed more on the front side in the rotation direction R of the turbine blade 60 than the trailing edge hub coordinate θb indicating the trailing edge hub position Pb (θb<θc).

With the configuration in the present embodiment, in which the leading edge hub coordinate θa is disposed more on the rear side in the rotation direction R of the turbine blade 60 than the trailing edge hub coordinate θb (θa<θb), the turbine blade 60 can be formed with the leading edge 61 inclined (bent) by an appropriate inclination angle in a range from 30° to 70°.

Furthermore, with the leading edge hub coordinate θa being disposed more on the rear side in the rotation direction R of the turbine blade 60 than the trailing edge hub coordinate θb (θa<θb), a turning angle of the turbine blade 60 can be set to a sufficiently small value.

More specifically, the turning angle, which is an angle for turning the flow of the working gas so that the working gas flows in the direction of the center line of rotation 23 of the turbine blade 60 along the pressure surface side 61a (back side in the drawing sheet) of the turbine blade 60 as indicated by an arrow H, can be set to a sufficiently small value.

A large turning angle leads to a large load on the blade, which causes a secondary flow and a leakage loss, and thus ultimately leads to a lower turbine efficiency. The turning angle represents a change of an angle, involving a meridional plane component and a swirling velocity component of a main flow (relative flow velocity W), from the leading edge to the trailing edge.

With the turning angle set to a sufficiently small value, the exhaust gas that has collided with the pressure surface side 61a is efficiently turned to the direction of the center line of rotation 23 to flow toward the trailing edge side 63. Thus, the exhaust gas can be prevented from flowing from the pressure surface side 61a toward the negative pressure surface side 61 through a clearance (chip clearance) on an outer circumference edge side of the turbine blade 60.

As illustrated in FIG. 3, an outer circumference edge portion line 60b which connects between the outer circumference edge portion of the turbine blade 60 on the shroud side may be set in such a manner that the relationship that is the same as that in the hub joining line 60a can be achieved.

More specifically, a line segment m3, connecting between a leading edge shroud position Sa on a leading edge shroud circle 75 formed by connecting between leading edges 61 of a plurality of the turbine blades 60 on the shroud side and the center line of rotation 23 of the turbine blade 60, is positioned more on the rear side in the rotation direction R of the turbine blade 60 about the center line of rotation 23 of the turbine blade 60, than a line segment m4, connecting between a trailing edge shroud position Sb on a trailing edge shroud circle 68 formed by connecting between trailing edges 63 of a plurality of turbine blades 60 on the shroud side and the center line of rotation 23 of the turbine blade 60 (θ'a>θ'b).

As described above, the leading edge 61 and the trailing edge 63 on the outer circumference edge portion line 60b on the shroud side preferably have the same positional relationship as that in the hub joining line 60a. With the same positional relationship achieved on the hub side and the shroud side, the working gas, which has collided with the pressure surface side 61a of the turbine blade 60, can be turned to the axial direction of the center line of rotation 23 of the turbine blade 60, along the pressure surface, whereby a lower loss can be achieved.

Third Embodiment

Figure 4A:
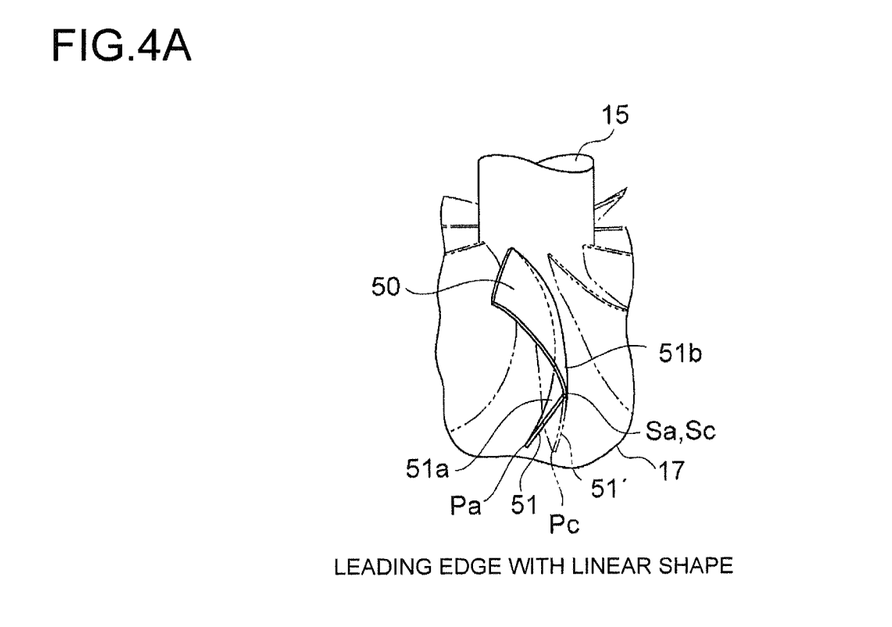
FIG. 4A is a perspective view showing a shape of a main part of a turbine blade according to a third embodiment and showing an overview of the entire shape.
Figure 4B:
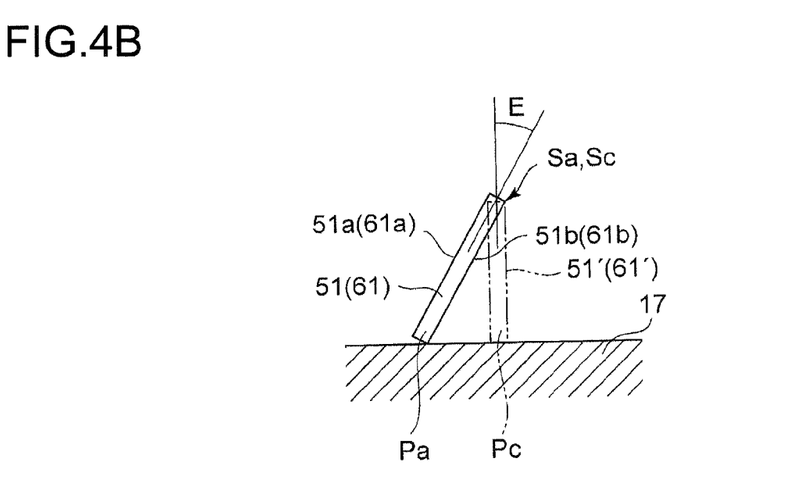
FIG. 4B is a diagram showing a detailed shape of a leading edge in the third embodiment.

With reference to FIG. 4, a third embodiment will be described.

In the third embodiment, the leading edge 51 or 61 of the turbine blade 50 in the first embodiment or the turbine blade 60 in the second embodiment is formed to have a substantially linear shape.

As shown in FIG. 4, a line segment connecting between the leading edge hub position Pa and a leading edge shroud position Sa, Sc has a substantially linear shape.

With such a linear shape, a uniform load of the turbine blade 50, 60 in the blade height direction can be achieved, whereby an unwanted secondary flow can be prevented from being produced.

Fourth Embodiment

Figure 5A:
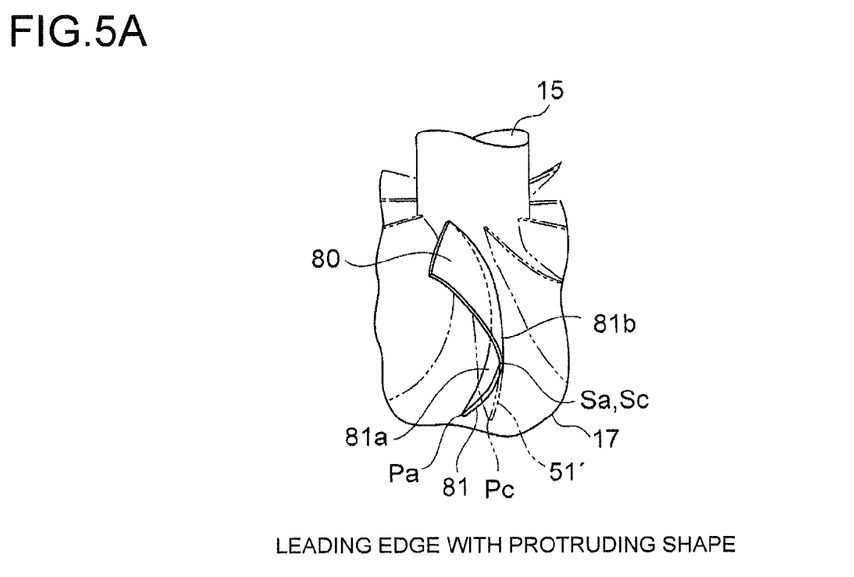
FIG. 5A is a perspective view showing a shape of a main part of a turbine blade according to a fourth embodiment and showing an overview of the entire shape.
Figure 5B:
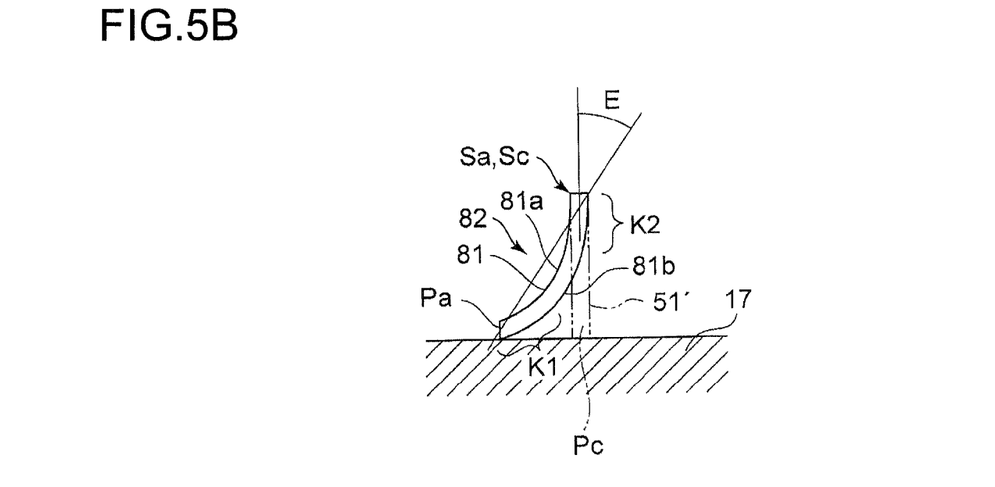
FIG. 5B is a diagram showing a detailed shape of a leading edge in the fourth embodiment.

With reference to FIG. 5, a fourth embodiment will be described.

In the fourth embodiment, the leading edge 51 or 61 of the turbine blade 50 in the first embodiment or the turbine blade 60 in the second embodiment is formed to have a curved shape 82.

As shown in FIG. 5, a line segment connecting between the leading edge hub position Pa and the leading edge shroud position Sa, Sc has the curved shape 82 with a leading edge 81 of a turbine blade 80 protruding in the rotation direction R.

With the curved shape 82 defined by the protrusion of the leading edge 81 of the turbine blade 80 in the rotation direction R of the turbine blade 80, an amount of working gas in the center portion is large considering the flow rate balance. Thus, by discharging the working gas in the center portion of the leading edge 81 toward the rear side along the direction of the center line of rotation 23 of the turbine blade 80, the working gas can be efficiently discharged in the direction toward the outlet. Thus, the leakage flow from the pressure surface side 81a toward the negative pressure surface side 81b can be more effectively prevented from being produced.

The leading edge has the curved shape 82 and thus has the following relationship. Specifically, the leading edge has, on a side K1 closer to the upper surface of the hub 17, a large inclination angle to have a shape extending along the hub surface, and has a smaller inclination angle on a shroud side K2.

This configuration is especially suitable for reducing the loss on the hub side involving a particularly large collision angle. More specifically, on the hub side, the working gas is difficult to turn to the direction toward the outlet and the radial direction flow velocity of the main flow (absolute flow velocity C) is high and thus the collision angle is large. With the large inclination on the side of the upper surface of the hub 17, a shape extending along the hub surface can be achieved, whereby a high loss reduction effect can be achieved.

Fifth Embodiment

Figure 6A:
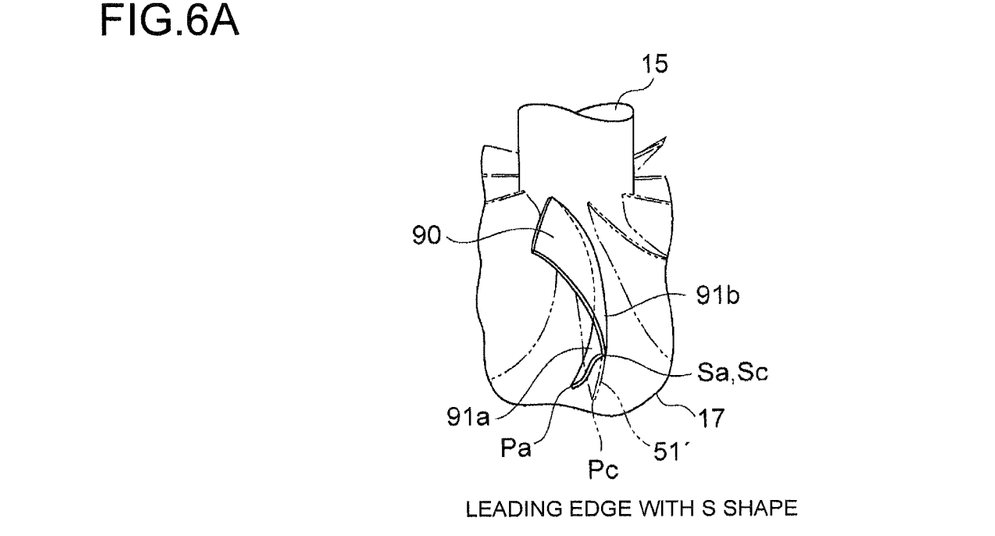
FIG. 6A is a perspective view showing a shape of a main part of a turbine blade according to a fifth embodiment and showing an overview of the entire shape.
Figure 6B:
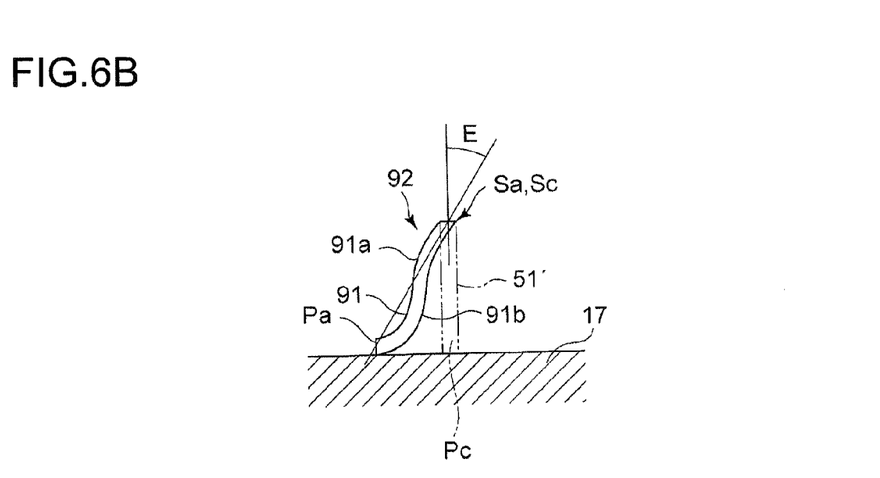
FIG. 6B is a diagram showing a detailed shape of a leading edge in the fifth embodiment.

With reference to FIG. 6, a fifth embodiment will be described.

In the fifth embodiment, the leading edge 51 or 61 of the turbine blade 50 in the first embodiment or the turbine blade 60 in the second embodiment is formed to have a substantially S shape 92.

As shown in FIG. 6, the line segment connecting between the leading edge shroud position Sa, Sc and the leading edge hub position Pa has the substantially S shape 92. More specifically, a leading edge 91 protrudes in the rotation direction R of a turbine blade 90 on a side closer to the hub 17 and protrudes in a direction opposite to the rotation direction R on the shroud side to have the substantially S shape 92 as a whole.

As described above, with the substantially S shape 92, on the side closer to the hub 17 involving a large collision angle, the leading edge continues to the hub surface with a large inclination angle. Thus, a lower impact loss can be achieved. On the shroud side, the leading edge protrudes in the direction opposite to the rotation direction R. Thus, the exhaust gas can be prevented from flowing through the clearance formed on the outer circumference edge portion 55 (FIG. 10A) on the shroud side and thus can be prevented from flowing toward the negative pressure surface side 90.

INDUSTRIAL APPLICABILITY

With the present invention, an impact loss of inflowing gas at a leading edge of a turbine blade can be reduced to achieve a high turbine efficiency, even in a case of a flow field corresponding to a low velocity ratio of low U/C0 due to a throttling operation on a variable nozzle mechanism of a variable geometry turbocharger. Thus, the present invention is a technique that can be effectively applied to the variable geometry turbocharger including the variable nozzle mechanism.

REFERENCE SIGNS LIST 1 radial turbine
3 variable geometry turbocharger
5 turbine casing
7 scroll
13 turbine rotor
15 rotor shaft
17 hub
19, 50, 60, 80, 90 turbine blade
23 center line of rotation
25 nozzle vanes
27 variable nozzle mechanism
51, 61, 81, 91 leading edge
60a hub joining line
60b outer circumference edge portion line
65 leading edge hub circle
67 trailing edge hub circle
68 trailing edge shroud circle
75 leading edge shroud circle
Pa leading edge hub position (hub-side end portion of leading edge)
Pb trailing edge hub position
Sa, Sc leading edge shroud position (shroud-side end portion of leading edge)
Sb trailing edge shroud position
R rotation direction of turbine blade
E inclination angle of leading edge

The invention claimed is:

1. A radial turbine blade configured to drivingly rotate a turbine rotor with working gas flowing in a radial direction from a spiral scroll formed in a turbine casing to a turbine blade of the turbine rotor positioned on an inner side of the scroll to act on the turbine blade and then flowing out in an axial direction, comprising a variable nozzle mechanism in which a plurality of nozzle vanes are disposed at an equal interval along a circumferential direction of a turbine on an inner circumference side of the scroll, and a blade angle of the nozzle vanes is changed, wherein
   a hub-side end portion at a leading edge of the turbine blade and on a hub surface is formed to be positioned more on a rear side in a rotation direction of the turbine blade than a shroud-side end portion at the leading edge, and a straight line, connecting between the shroud-side end portion and the hub-side end portion, is inclined with respect to a straight line, extending in a rotation axis direction from the shroud-side end portion at the leading edge onto the hub surface, by an angle in a range from 30° to 70° in a radial direction view of the turbine blade.

2. The radial turbine blade according to claim 1, wherein a line segment, connecting between a leading edge hub position on a leading edge hub circle formed by connecting between leading edges of a plurality of the turbine blades on the hub surface and a center line of rotation of the turbine blade, is positioned more on the rear side in the rotation direction of the turbine blade about the center line of rotation of the turbine blade than a line segment, connecting between a rear edge hub position on a rear edge hub circle formed by connecting between rear edges of the plurality of turbine blades on a hub and the center line of rotation of the turbine blade.

3. The radial turbine blade according to claim 2, wherein a line segment, connecting between a leading edge shroud position on a leading edge shroud circle formed by connecting leading edges of the plurality of turbine blades on a shroud side and the center line of rotation of the turbine blade, is positioned more on the rear side in the rotation direction of the turbine blade about the center line of rotation of the turbine blade than a line segment, connecting between a rear edge shroud position on a rear edge shroud circle formed by connecting between rear edges of the plurality of turbine blades on the shroud side and the center line of rotation of the turbine blade.

4. The radial turbine blade according to claim 1, wherein the leading edge of the turbine blade, connecting between the shroud-side end portion and the hub-side end portion, is formed to have a substantially linear shape in the radial direction view of the turbine blades.

5. The radial turbine blade according to claim 1, wherein the leading edge of the turbine blade, connecting between the shroud-side end portion and the hub-side end portion, is formed to have a curved shape protruding in the rotation direction of the turbine blade in the radial direction view of the turbine blade.

6. The radial turbine blade according to claim 5, wherein the curved shape is formed with a hub side inclined by a large inclination angle and extending along the hub surface and a shroud side inclined by a smaller inclination angle.

7. The radial turbine blade according to claim 1, wherein the leading edge of the turbine blade, connecting between the shroud-side end portion and the hub-side end portion, has a hub side protruding in the rotation direction of the turbine blade and has a shroud side protruding in a direction opposite to the rotation direction, so that the leading edge as a whole is formed to have a substantially S shape.

* * * * *